(12) United States Patent
Kipnis et al.

(10) Patent No.: US 10,650,113 B2
(45) Date of Patent: May 12, 2020

(54) MODIFYING CIRCUITS BASED ON TIMING REPORTS FOR CRITICAL PATHS

(71) Applicant: INTERNATIONAL BUSINESS MACHINES CORPORATION, Armonk, NY (US)

(72) Inventors: Rina Kipnis, Kiriat Motzkin (IL); Vadim Liberchuk, Karmiel (IL); Alex Raphayevich, Kiryat Ekron (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 15/949,171

(22) Filed: Apr. 10, 2018

(65) Prior Publication Data

US 2019/0311085 A1    Oct. 10, 2019

(51) Int. Cl.
    *G06F 17/50* (2006.01)
(52) U.S. Cl.
    CPC ...... *G06F 17/5077* (2013.01); *G06F 17/5031* (2013.01); *G06F 17/5081* (2013.01); *G06F 2217/02* (2013.01); *G06F 2217/06* (2013.01); *G06F 2217/12* (2013.01); *G06F 2217/84* (2013.01)
(58) Field of Classification Search
    USPC ........................................................ 716/113
    See application file for complete search history.

(56) References Cited

U.S. PATENT DOCUMENTS

| | | | |
|---|---|---|---|
| 8,949,760 B2 | 2/2015 | Birch et al. | |
| 9,501,604 B1 | 11/2016 | More et al. | |
| 2007/0150846 A1* | 6/2007 | Furnish | G06F 17/5068 716/122 |
| 2008/0216038 A1* | 9/2008 | Bose | G06F 17/5072 716/118 |
| 2009/0254874 A1* | 10/2009 | Bose | G06F 17/5068 716/113 |
| 2012/0096417 A1* | 4/2012 | Durbha | G06F 17/5045 716/103 |
| 2013/0185685 A1 | 7/2013 | Thoziyoor et al. | |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

*Primary Examiner* — Mohammed Alam
(74) *Attorney, Agent, or Firm* — Margaret A. McNamara, Esq.; Kevin P. Radigan, Esq.; Heslin Rothenberg Farley & Mesiti P.C.

(57) ABSTRACT

Generating reports for critical path evaluation and tuning. A predetermined critical path in a circuit design is detected. The predetermined critical path includes a plurality of interconnects between at least two macros. At least one output or at least one input is detected for each of the at least two macros associated with the predetermined critical path. Additionally, a routing description and a buffer location corresponding to the predetermined critical path are detected and a reduced layout design is built. The reduced layout design includes the predetermined critical path and the at least two macros. Furthermore, a timing report is generated based on the reduced layout design, and a circuit based on the circuit design is manufactured in response to detecting the timing report based on the reduced layout design satisfies a predetermined condition.

20 Claims, 6 Drawing Sheets

MODIFYING CIRCUITS BASED ON TIMING REPORTS FOR CRITICAL PATHS

BACKGROUND

One or more aspects relate to circuit designs, and more specifically, but not exclusively, to modifying a circuit design based on a timing report for a critical path.

SUMMARY

Shortcomings of the prior art are overcome and additional advantages are provided through the provision of a system for critical path evaluation and tuning. The system includes at least one processor configured to perform a method. The method includes detecting a predetermined critical path in a circuit design. The predetermined critical path includes a plurality of interconnects between at least two macros. At least one output or at least one input is detected for each of one or more macros of the at least two macros associated with the predetermined critical path. The at least one input or the at least one output includes a location for each of the one or more macros and macro pin information. A routing description and a buffer location corresponding to the predetermined critical path are detected. A reduced layout design is built. The reduced layout design includes the predetermined critical path and the at least two macros. A timing report is generated based on the reduced layout design. Manufacturing of a circuit based on the circuit design is initiated, based on detecting the timing report based on the reduced layout design satisfies a predetermined condition.

Computer-implemented methods and computer program products relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
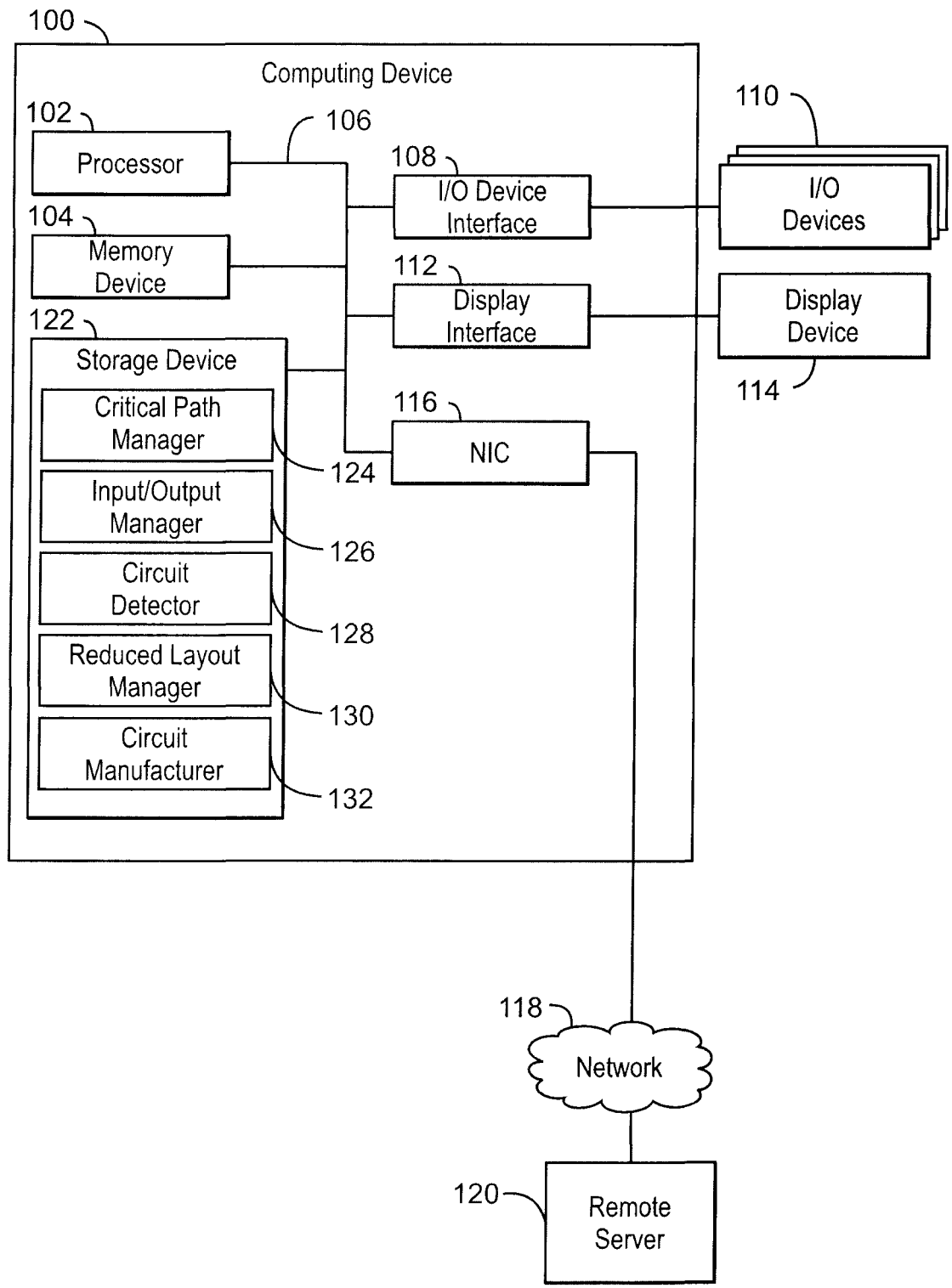
FIG. 1 depicts a block diagram of an example computing system that can modify a circuit based on a timing report for a critical path according to an embodiment described herein.

Static timing analysis (STA) is a technique for simulating the expected timing of a digital circuit without requiring a simulation of the full circuit. In some examples, high performance integrated circuits have traditionally been characterized by the clock frequency at which the integrated circuits operate. Determining the ability of a circuit to operate at a specified speed may include measuring, during the design process, the delay within the circuit. Moreover, delay calculation can be incorporated into the inner loop of timing optimizers at various phases of design, such as logic synthesis, layout (placement and routing), and in in-place optimizations performed late in the design cycle. Static timing analysis enables the fast and reasonably accurate measurement of circuit timing.

In some examples, the structure and behavior of electronic circuits and digital logic circuits can be described using a hardware description language (HDL). HDLs enable precise, formal descriptions of electronic circuits that allow for automated analysis and simulation. For example, the electronic circuits may include complex circuits, such as application-specific integrated circuits (ASICs), microprocessors, and programmable logic devices (PLDs). HDLs are standard text-based expressions of the structure of electronic systems and their behavior over time. HDLs thus also include an explicit notion of time, which may be a primary attribute of hardware. For example, the Very High Speed Integrated Circuit (VHSIC) Hardware Description Language (VHDL) is an HDL used in electronic design automation to describe digital and mixed-signal systems, such as field-programmable gate arrays and integrated circuits. A macro written in VHDL may include multiple design abstractions organized as a hierarchy. For example, a higher level of a hierarchy may be a register-transfer level (RTL). An RTL can be used to model a synchronous digital circuit in terms of the flow of digital signals (data) between hardware registers, and the logical operations performed on those signals. In some examples, lower-level representations and ultimately actual wiring can be derived from higher level representations.

During the circuit design process, integration information corresponding to routing interconnects between macros can be detected before detecting information about a source macro output arrival time and a sink macro input arrival time. In order to test the integration information, currently a schematic is generated with devices, wire models to represent wiring and parasitic influence, and resistors to represent vias in a layout of the circuit design. In some examples, a simulation is performed to analyze timing based on the schematic. However, generating the schematic is time intensive and a new schematic may be generated following each modification to integration information in a circuit design.

In embodiments described herein, techniques for critical path or interconnect evaluation between macros based on integration information can be performed without generating a schematic model of a circuit design. The techniques can include generating an actual path from a design in a layout and using evaluation applications to detect timing of the actual path. Accordingly, the techniques described herein can be used when a full circuit design is not yet generated or during an implementation stage to evaluate a possible critical path in a circuit design.

In some embodiments described herein, a device or designer module for designing a circuit can detect a predetermined critical path in a circuit design, wherein the predetermined critical path comprises a plurality of interconnects between at least two macros. The device or designer module can also detect at least one output or at least one input for each of the two macros associated with the predetermined critical path, the input or the output comprising a location for each of the macros and macro pin information.

Additionally, the device or designer module can detect a routing description and a buffer location corresponding to the predetermined critical path. Furthermore, the device or a tool module can build a reduced layout design, the reduced layout design comprising the predetermined critical path and the two macros. In addition, the device or tool module can generate a timing report based on the reduced layout design and manufacture a circuit based on the circuit design in response to detecting the timing report based on the reduced layout design satisfies a predetermined condition.

Accordingly, one or more of the techniques described herein can enable the design and manufacture of a new circuit based on analyzing a reduced layout design of the circuit for timing issues. Therefore, one or more of the techniques described herein can reduce the time to analyze timing constraints in circuit designs. For example, one or more of the techniques can use the same timing models as a core or chip verification application. One or more of the techniques can also provide evaluation of integration information of a circuit design during a timing triage. In some embodiments, a new circuit can be generated based on a circuit design that is analyzed and modified based on updated macros or buffer locations in a reduced layout design of the circuit.

With reference now to FIG. 1, an example computing device is depicted that can modify a circuit based on a timing report for a critical path. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 may include a critical path manager 124, an input/output manager 126, a circuit detector 128, a reduced layout manager 130, and a circuit manufacturer 132. In some embodiments, the critical path manager 124 can detect a predetermined critical path in a circuit design, wherein the predetermined critical path comprises a plurality of interconnects between at least two macros. In some embodiments, the input/output manager 126 can detect at least one output or at least one input for each of the two macros associated with the predetermined critical path, the input or the output comprising a location for each of the macros and macro pin information. In some embodiments, the circuit detector 128 can detect a routing description and a buffer location corresponding to the predetermined critical path. In some embodiments, the reduced layout manager 130 can build a reduced layout design, the reduced layout design comprising the predetermined critical path and the two macros. The reduced layout manager 130 can also generate a timing report based on the reduced layout design. Furthermore, the circuit manufacturer 132 can manufacture a circuit based on the circuit design in response to detecting the timing report based on the reduced layout design satisfies a predetermined condition.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the critical path manager 124, input/output manager 126, circuit detector 128, reduced layout manager 130, and circuit manufacturer 132 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the critical path manager 124, input/output manager 126, circuit detector 128, reduced layout manager 130, and circuit manufacturer 132 can be implemented with logic, wherein the logic, as referred to herein, can include any suitable hardware (e.g., a processor, among others), software (e.g., an application, among others), firmware, or any suitable combination of hardware, software, and firmware.

Figure 2:
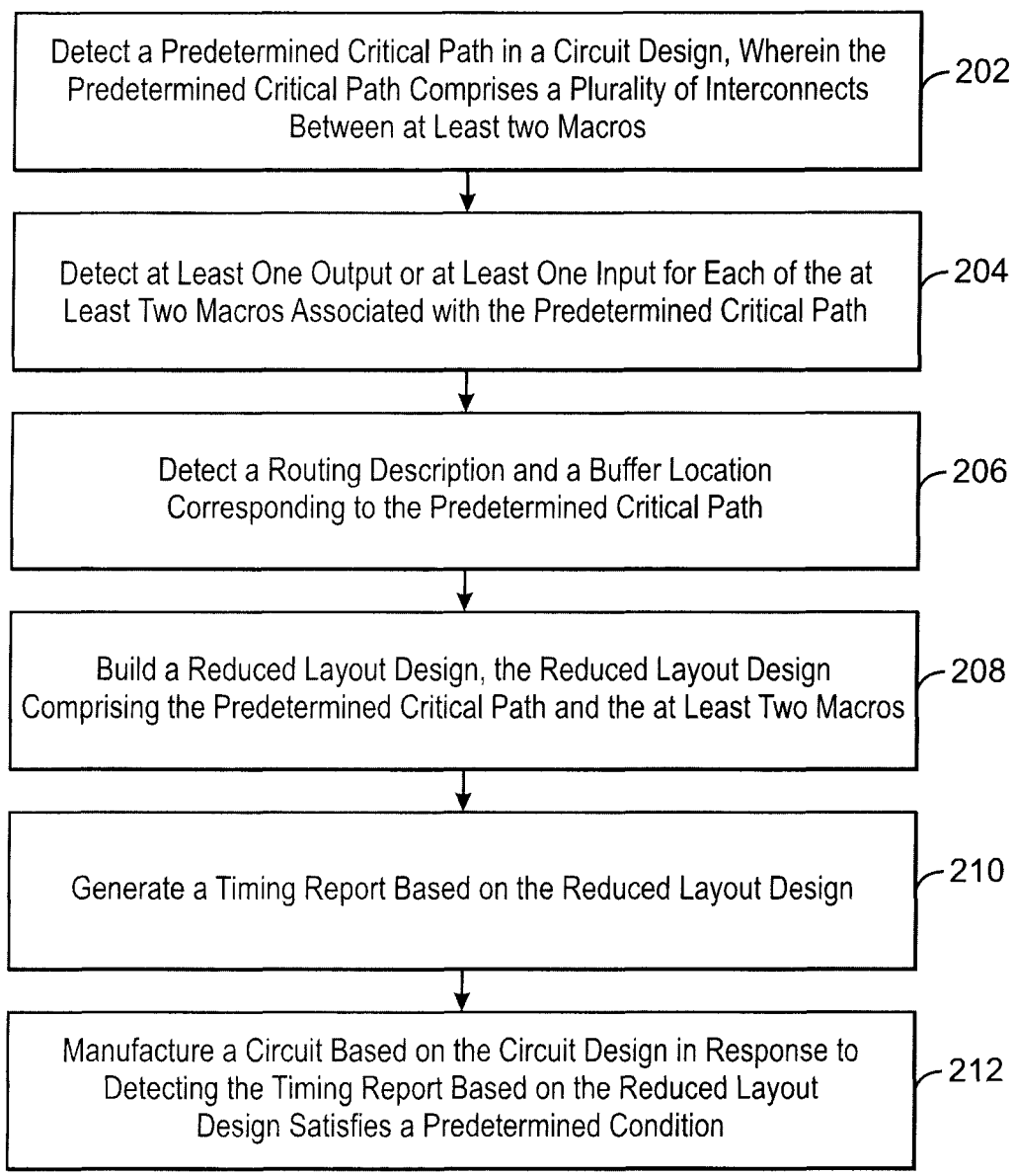
FIG. 2 is a process flow diagram of an example method that can modify a circuit based on a timing report for a critical path according to an embodiment described herein.

FIG. 2 is a process flow diagram of an example method that can modify a circuit based on a timing report for a critical path. The method 200 can be implemented with any one or more suitable computing devices, such as the computing device 100 of FIG. 1.

At block 202, in one example, the critical path manager 124 can detect a predetermined critical path in a circuit design, wherein the predetermined critical path comprises a plurality of interconnects between at least two macros. A critical path, as referred to herein, can include any suitable interconnects that transmit a signal from a first macro to a second macro. As discussed above, a macro, as referred to herein, can include a sub-division of a circuit based on related logic that performs a common task. For example, a macro can include logic performing an adder calculation, or logic performing address generation, among others. The critical path can include any interconnects that are to be analyzed for a timing issue. For example, interconnects may transmit a signal either too slowly or too quickly. In some examples, the critical path can reside in any suitable layer of a circuit. The critical path can also include any suitable number of macros, buffers, and the like.

At block 204, the input/output manager 126 can detect at least one output or at least one input for each of the at least two macros associated with the predetermined critical path. In some examples, the input or the output can include a location for each of the macros and macro pin information. In some examples, the location for each macro can be normalized based on a circuit design. For example, the location of each macro can be based on grid coordinates of a circuit. In some embodiments, the input/output manager 126 can detect macro pin information comprising a slew, a delay, a load, and a phase for each input pin or each output pin for each macro. In some examples, timing for each macro can be modeled based on macro pin information for a single input pin or a single output pin for a macro. The macro pin information can be predetermined and provided by way of a text file, or any other suitable input. In some embodiments, the two macros comprise a driving macro with an output pin, and a sink macro with an input pin. The sink macro can include a latch in some embodiments. In some examples, the two macros can also include a bypass macro with an input pin and an output pin. The driving macro, bypass macro, and sink macro are described in greater detail below in relation to FIG. 3.

At block 206, the circuit detector 128 can detect a routing description and a buffer location corresponding to the predetermined critical path. In some embodiments, the routing description comprises a layer for at least one of the interconnects. In some examples, the routing description can also indicate a length of interconnects of a critical path between two macros, a metal layer of the interconnects, and the like. In some examples, a plurality of integration buffers or inverter locations are outside of the two macros. The buffer location can indicate where each integration buffer or inverter is located in relation to the macros connected by interconnects of the critical path.

At block 208, the reduced layout manager 130 can build a reduced layout design, the reduced layout design comprising the predetermined critical path and the two macros. In some examples, the reduced layout manager 130 can detect the reduced layout design from a circuit design file, such as a hardware description language file, or a VHDL file, among others. In some examples, the reduced layout manager 130 can detect user input indicating the reduced layout design corresponding to a set of macros and interconnects corresponding to the critical path to be analyzed for timing issues. In some examples, the reduced layout manager 130 can generate a reduced layout design using a script based on a text file comprising the buffer location, the macro pin information, connectivity data indicating how pins are interconnected for the two macros, a plurality of layout layers, and buffers used for connection between the two macros. The reduced layout design can exclude macros, interconnects, and buffers that are not associated with an interconnect of a critical path being analyzed. Accordingly, the reduced layout design can enable detecting timing information for a critical path quickly by focusing on a subset of macros, interconnects, and buffers within a circuit design.

At block 210, the reduced layout manager 130 can also generate a timing report based on the reduced layout design. In some embodiments, the timing report can indicate timing delays for any number of critical paths in the reduced layout design. In some examples, the timing report can be generated by a remote device and transmitted to a cloud service that executes the circuit manufacturer 132 described in block 212 below. In some examples, the timing report can indicate an estimated time to transmit an electrical signal between multiple macros and multiple gates, among others. In some embodiments, the reduced layout manager 130 can indicate whether a modification to the reduced layout design is to be generated in order to transmit an electrical signal between two macros within a desired time constraint.

In some embodiments, the reduced layout manager 130 can detect a modification of one of the interconnects between the two macros in the reduced layout design, wherein the modification comprises adding or removing repeaters, changing layout routing layers, changing a location of the two macros, or changing macro pin location. The reduced layout manager 130 can also generate the timing report based on the modification to the reduced layout design. In some examples, the reduced layout manager 130 can generate the timing report based on actual routing information for the reduced layout design using a common application that generated a second timing report for the circuit design. In some examples, the reduced layout manager 130 can exclude a power mesh and a filler from the reduced layout design. Accordingly, the reduced layout manager 130 may not implement a power mesh or filler to ensure proper chip or circuit functionality. In some embodiments, timing information in the timing report comprises data for the plurality of interconnects of the critical path, and each of the two macros.

In some embodiments, the reduced layout manager 130 can analyze the timing of a reduced layout design based on negative and positive paths for the critical paths. For example, the slack associated with each critical path in a circuit can be measured as the difference between the required range of time for the path to transmit an electrical signal and the estimated arrival time of an electrical signal using the critical path. In some examples, the estimated arrival time is based on a simulation or circuit timing test of the reduced layout design. A positive slack implies that the arrival time at a gate or node in the reduced layout design may be increased without affecting the overall delay of the circuit. Conversely, negative slack implies that a critical path is too slow, and the critical path can be sped up (or the reference signal delayed) if the circuit is to work at a desired speed. A path with negative slack is referred to herein as a negative path.

At block 212, the circuit manufacturer 132 can manufacture a circuit based on the circuit design in response to detecting the timing report based on the reduced layout design satisfies a predetermined condition. For example, the timing report can indicate that signals transmitted between macros and buffers corresponding to a critical path are within a predetermined time range. In some embodiments, the circuit manufacturer 132 can transmit instructions to an automated manufacturing device to manufacture a circuit.

In some examples, the circuit manufacturer 132 can detect that the timing report indicates a timing issue in the reduced layout design. The circuit manufacturer 132 can modify a simulation of a circuit based on a modification to the reduced layout design that remedies the timing issue. A modification can include routing a critical path through a different layer, reducing the length of the critical path, moving the location of macros or buffers connected to the critical path, and the like. The circuit manufacturer 132 can fabricate a circuit based on a circuit design including the modified critical path of the reduced circuit layout.

The process flow diagram of FIG. 2 is not intended to indicate that the operations of the method 200 are to be executed in any particular order, or that all of the operations of the method 200 are to be included in every case. For example, the method 200 can include updating a number or a location of a buffer, an inverter, or a routing type residing outside of the at least two macros.

Figure 3:
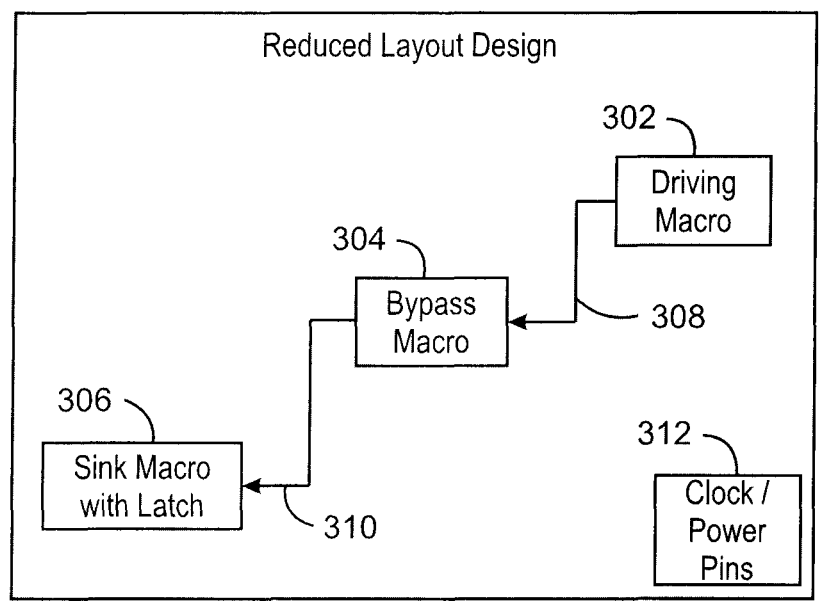
FIG. 3 is an example block diagram of a reduced layout design for a critical path.

FIG. 3 is an example block diagram of a reduced layout design for a critical path. The reduced layout design 300 can include any suitable number of macros, such as a driving macro 302, a bypass macro 304, and a sink macro 306. As discussed above, a macro can include a sub-division of a circuit based on related logic that performs a common task. The logic of a macro can be modeled as a box with a single input and/or a single output. The delay associated with each macro can be predetermined and provided as an input value for the reduced layout design 300. For example, the delay associated with each macro can be provided as input in a text file, a VHDL file, and the like. In some embodiments, the driving macro 302 can include a single output pin value, the bypass macro 304 can include a single input pin value and a single output pin value, and a sink macro 306 can include a single input pin value. The sink macro 306 can include a latch or a flip-flop in some examples, wherein the latch can store a value. The interconnects 308 and 310 between the driving macro 302, bypass macro 304, and sink macro 306 can be simulated with the reduced layout design to detect any timing issues. A timing issue may indicate that a signal transmitted by the interconnected 308 and 310 is transmitted outside of a predetermined time range. In some examples, any suitable number of buffers can also reside between the driving macro 302, bypass macro 304, and sink macro 306. Accordingly, the timing of the buffers can also be tested in the reduced layout design along with the interconnects 308 and 310 of the critical path.

In some examples, the locations of the driving macro 302, bypass macro 304, and sink macro 306 can be modified in response to detecting a timing issue in the reduced layout design 300. In some embodiments, the interconnects 308 and 310 can also be modified to be routed through different layers of the reduced layout design 300. Additionally, a location of buffers residing between the driving macro 302, bypass macro 304, and sink macro 306 can be modified to prevent a timing issue.

It is to be understood that the reduced layout design 300 can include fewer or additional macros, interconnects, and the like. In some examples, any suitable number of buffers can be added between the macros of the reduced layout design 300. The reduced layout design can also include clock/power pins 312 that can simulate a clock signal that drives transmission of a signal between the driving macro 302, bypass macro 304, and sink macro 306.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
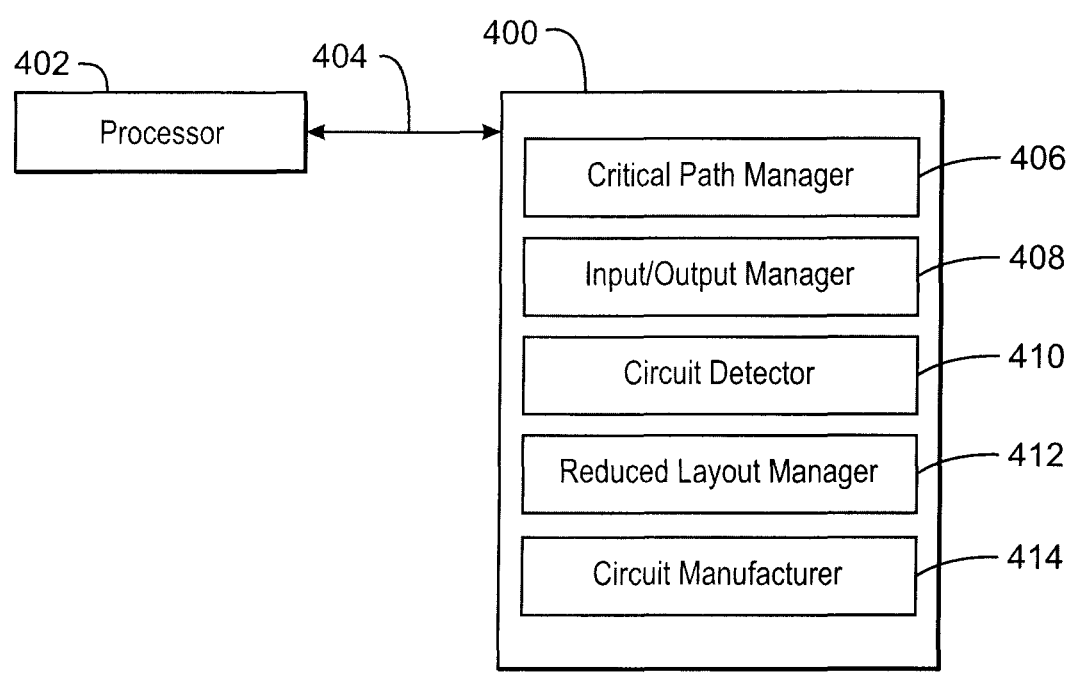
FIG. 4 is a tangible, non-transitory computer-readable medium that can modify a circuit based on a timing report for a critical path according to an embodiment described herein.

Referring now to FIG. 4, a block diagram is depicted of an example of a tangible, non-transitory computer-readable medium that can modify a circuit based on a timing report for a critical path. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, a critical path manager 406 can detect a predetermined critical path in a circuit design, wherein the predetermined critical path comprises a plurality of interconnects between at least two macros. In some embodiments, an input/output manager 408 can detect at least one output or at least one input for each of the at least two macros associated with the predetermined critical path, the at least one input or the at least one output comprising a location for each of the macros and macro pin information. In some embodiments, a circuit detector 410 can detect a routing description and a buffer location corresponding to the predetermined critical path. In some embodiments, a reduced layout manager 412 can build a reduced layout design, the reduced layout design comprising the predetermined critical path and the at least two macros. The reduced layout manager 412 can also generate a timing report based on the reduced layout design. Furthermore, a circuit manufacturer 414 can manufacture a circuit based on the circuit design in response to detecting the timing report based on the reduced layout design satisfies a predetermined condition.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 5:
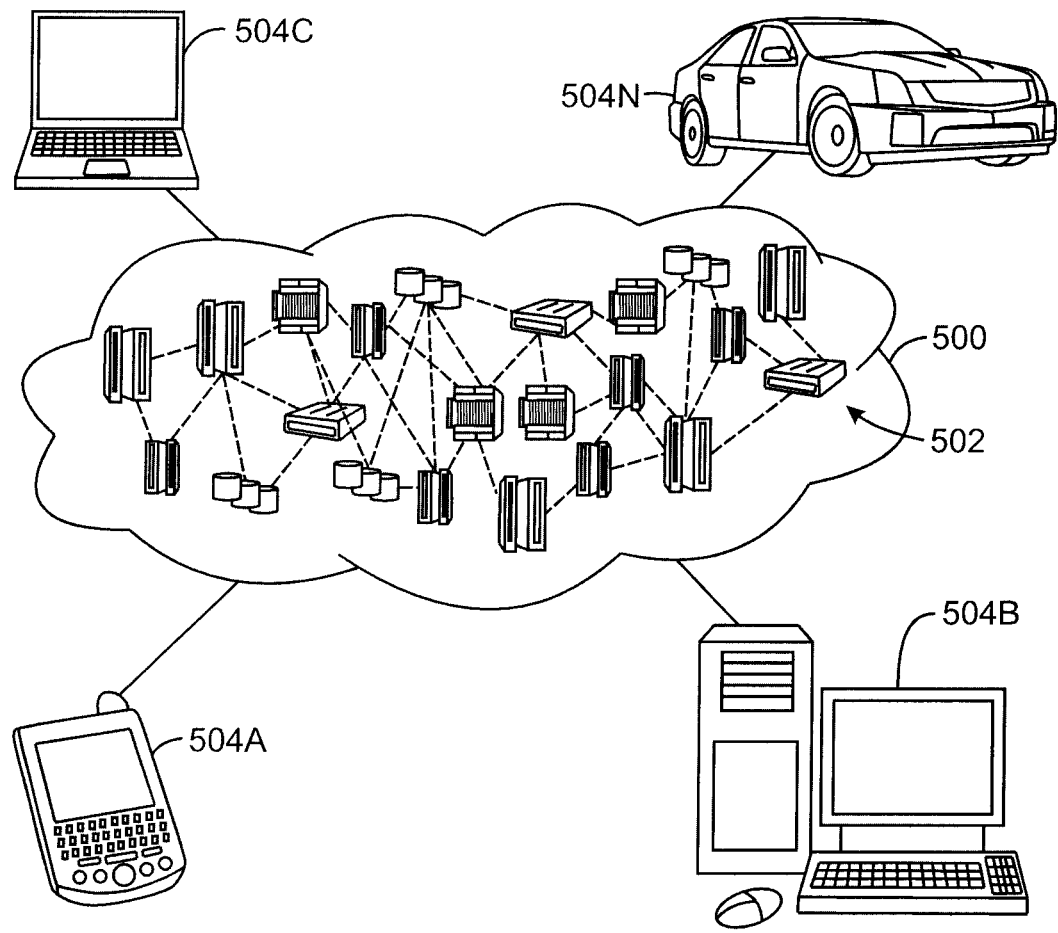
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
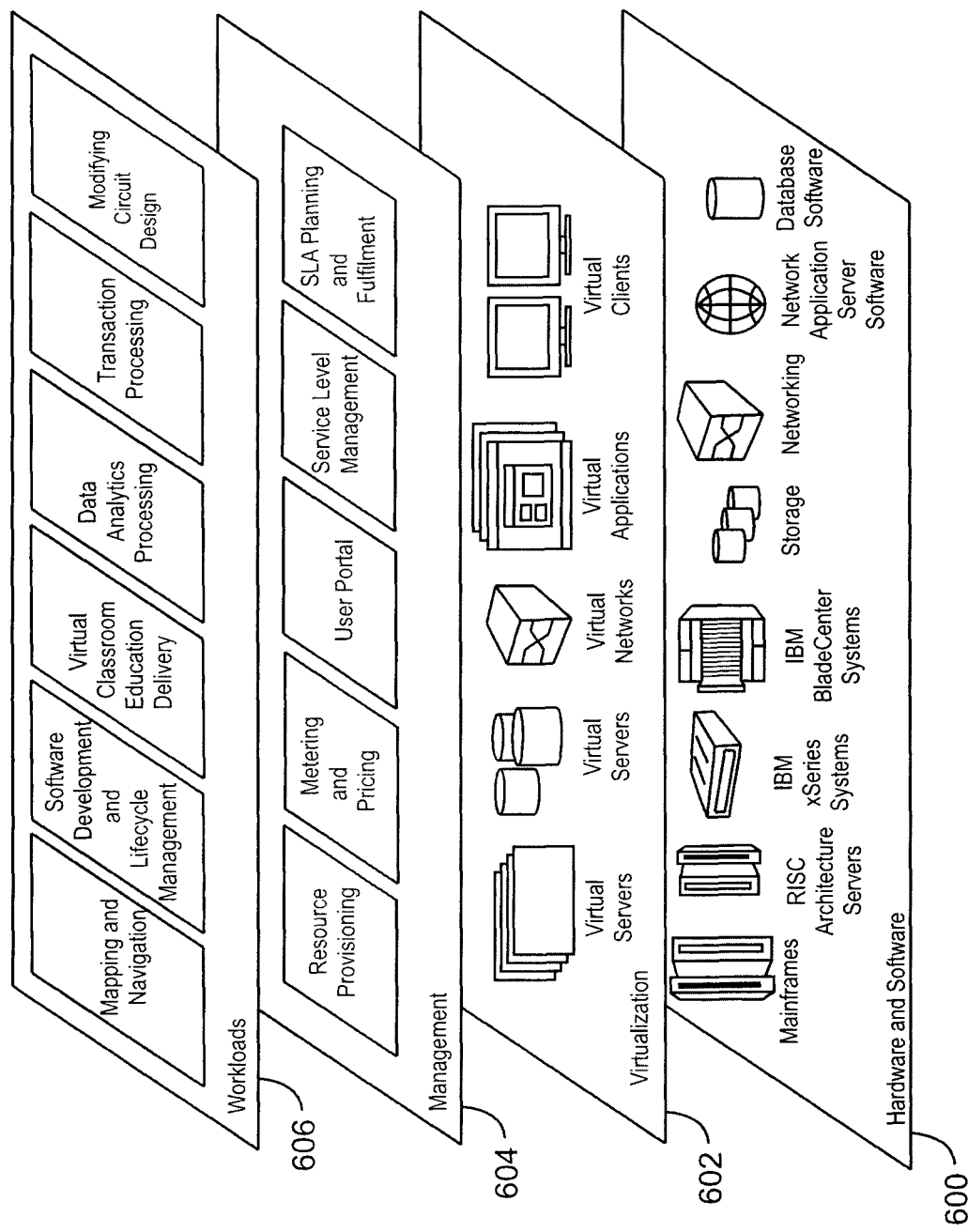
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes; RISC (Reduced Instruction Set Computer) architecture based servers; servers; blade servers; storage devices; and networks and networking components. In some embodiments, software components include network application server software and database software.

Virtualization layer 602 provides an abstraction layer from which the following examples of virtual entities may be provided: virtual servers; virtual storage; virtual networks, including virtual private networks; virtual applications and operating systems; and virtual clients.

In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and modifying a circuit based on a timing report for a critical path.

According to an embodiment described herein, a system for generating reports for critical path evaluation and tuning can include a processor or process to detect a predetermined critical path in a circuit design, wherein the predetermined critical path comprises a plurality of interconnects between at least two macros. The processor or process can also detect at least one output or at least one input for each of the at least two macros associated with the predetermined critical path, the at least one input or the at least one output comprising a location for each of the macros and macro pin information. Additionally, the processor or process can detect a routing description and a buffer location corresponding to the predetermined critical path. Furthermore, the processor or process can build a reduced layout design, the reduced layout design comprising the predetermined critical path and the at least two macros. In addition, the processor or process can generate a timing report based on the reduced layout design and manufacture a circuit based on the circuit design in response to detecting the timing report based on the reduced layout design satisfies a predetermined condition.

In one embodiment, the macro pin information comprises a slew, a delay, a load, and a phase.

As an example, the at least two macros comprise a driving macro with an output pin, and a sink macro with an input pin. In another embodiment, the at least two macros comprise a bypass macro with an input pin and an output pin. Further, in one example, the sink macro comprises a latch.

In one embodiment, the processor is to generate a reduced layout design using a script based on a text file comprising the buffer location, the macro pin information, connectivity data indicating how pins are interconnected for the at least two macros, a plurality of layout layers, and buffers used for connection between the at least two macros.

In one embodiment, the processor is to detect a modification of one of the interconnects between the at least two macros in the reduced layout design, wherein the modification comprises adding or removing repeaters, changing layout routing layers, changing a location of the at least two macros, or changing macro pin location; and generate the timing report based on the modification to the reduced layout design.

In one embodiment, the processor is to generate the timing report based on actual routing information for the reduced layout design using a common application that generated a second timing report for the circuit design.

As an example, a plurality of integration buffer or inverter locations are outside of the at least two macros.

In one example, the routing description comprises a layer for at least one of the interconnects.

In one embodiment, the processor is to exclude a power mesh and a filler from the reduced layout design.

As an example, timing information in the timing report comprises data for the plurality of interconnects, and each of the at least two macros.

In one embodiment, the processor is to update a number or a location of a buffer, an inverter, or a routing type residing outside of the at least two macros.

According to another embodiment, a method for generating reports for critical path evaluation and tuning can include detecting a predetermined critical path in a circuit design, wherein the predetermined critical path comprises a plurality of interconnects between at least two macros. The method can also include detecting at least one output or at least one input for each of the at least two macros associated with the predetermined critical path, the at least one input or the at least one output comprising a location for each of the macros and macro pin information. Furthermore, the method can include detecting a routing description and a buffer location corresponding to the predetermined critical path and building a reduced layout design, the reduced layout design comprising the predetermined critical path and the at least two macros. In addition, the method can include generating a timing report based on the reduced layout design and manufacturing a circuit based on the circuit design in response to detecting the timing report based on the reduced layout design satisfies a predetermined condition.

According to another embodiment, a computer program product for generating reports for critical path evaluation and tuning can include a computer readable storage medium having program instructions embodied therewith, wherein the computer readable storage medium is not a transitory signal per se. The program instructions can be executable by a processor to cause the processor to detect a predetermined critical path in a circuit design, wherein the predetermined critical path comprises a plurality of interconnects between at least two macros. The program instructions can also be executable by a processor to cause the processor to detect at least one output or at least one input for each of the at least two macros associated with the predetermined critical path, the at least one input or the at least one output comprising a location for each of the macros and macro pin information. Furthermore, the program instructions can be executable by a processor to cause the processor to detect a routing description and a buffer location corresponding to the predetermined critical path and build a reduced layout design, the reduced layout design comprising the predetermined critical path and the at least two macros. In addition, the program instructions can be executable by a processor to cause the processor to generate a timing report based on the reduced layout design and manufacture a circuit based on the circuit design in response to detecting the timing report based on the reduced layout design satisfies a predetermined condition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating reports for critical path evaluation and tuning, said system comprising:
at least one processor configured to perform a method, said method comprising:
detecting a predetermined critical path in a circuit design, wherein the predetermined critical path comprises a plurality of interconnects between at least two macros;
based on detecting the predetermined critical path in the circuit design, further detecting:
at least one output or at least one input for each of one or more macros of the at least two macros associated with the predetermined critical path, the at least one input or the at least one output comprising a location for each of the one or more macros and macro pin information; and
a routing description and a buffer location corresponding to the predetermined critical path;
building a reduced layout design, the reduced layout design comprising the predetermined critical path and the at least two macros of the circuit design, wherein the reduced layout design is a subset of the circuit design which excludes macros, interconnects, and buffers of the circuit design not associated with the predetermined critical path;

generating a timing report based on the reduced layout design; and initiating manufacturing of a circuit based on the circuit design, based on detecting the timing report based on the reduced layout design satisfies a predetermined condition.

2. The system of claim 1, wherein the macro pin information comprises a slew, a delay, a load, and a phase.

3. The system of claim 1, wherein the at least two macros comprise a driving macro with an output pin, and a sink macro with an input pin.

4. The system of claim 3, wherein the sink macro comprises a latch.

5. The system of claim 1, wherein the at least two macros comprise a bypass macro with an input pin and an output pin.

6. The system of claim 1, wherein the building the reduced layout design comprises using a script based on a text file comprising the buffer location, the macro pin information, connectivity data indicating how pins are interconnected for the at least two macros, a plurality of layout layers, and buffers used for connection between the at least two macros.

7. The system of claim 1, wherein the method further comprises:
   detecting a modification of one of the interconnects between the at least two macros in the reduced layout design, wherein the modification comprises a modification selected from the group consisting of: adding repeaters, removing repeaters, changing layout routing layers, changing a location of the at least two macros, and changing a macro pin location; and
   generating the timing report based on the modification to the reduced layout design.

8. The system of claim 1, wherein the generating the timing report comprises generating the timing report based on actual routing information for the reduced layout design using a common application that generated a second timing report for the circuit design.

9. The system of claim 1, wherein a plurality of integration buffer locations or inverter locations are outside of the at least two macros.

10. The system of claim 1, wherein the routing description comprises a layer for at least one of the interconnects.

11. The system of claim 1, wherein timing information in the timing report comprises data for the plurality of interconnects, and each of the at least two macros.

12. A computer program product for generating reports for critical path evaluation and tuning comprising:
   a computer readable storage medium readable by a processing circuit and storing instructions for performing a method comprising:
      detecting a predetermined critical path in a circuit design, wherein the predetermined critical path comprises a plurality of interconnects between at least two macros;
      based on detecting the predetermined critical path in the circuit design, further detecting:
         at least one output or at least one input for each of one or more macros of the at least two macros associated with the predetermined critical path, the at least one input or the at least one output comprising a location for each of the one or more macros and macro pin information; and
         a routing description and a buffer location corresponding to the predetermined critical path;
      building a reduced layout design, the reduced layout design comprising the predetermined critical path and the at least two macros of the circuit design, wherein the reduced layout design is a subset of the circuit design which excludes macros, interconnects, and buffers of the circuit design not associated with the predetermined critical path;
      generating a timing report based on the reduced layout design; and
      initiating manufacturing of a circuit based on the circuit design, based on detecting the timing report based on the reduced layout design satisfies a predetermined condition.

13. The computer program product of claim 12, wherein the macro pin information comprises a slew, a delay, a load, and a phase.

14. The computer program product of claim 12, wherein the building the reduced layout design comprises using a script based on a text file comprising the buffer location, the macro pin information, connectivity data indicating how pins are interconnected for the at least two macros, a plurality of layout layers, and buffers used for connection between the at least two macros.

15. The computer program product of claim 12, wherein the method further comprises:
   detecting a modification of one of the interconnects between the at least two macros in the reduced layout design, wherein the modification comprises a modification selected from the group consisting of: adding repeaters, removing repeaters, changing layout routing layers, changing a location of the at least two macros, and changing a macro pin location; and
   generating the timing report based on the modification to the reduced layout design.

16. The computer program product of claim 12, wherein the generating the timing report comprises generating the timing report based on actual routing information for the reduced layout design using a common application that generated a second timing report for the circuit design.

17. A computer-implemented method of generating reports for critical-path evaluation and tuning comprising:
   detecting a predetermined critical path in a circuit design, wherein the predetermined critical path comprises a plurality of interconnects between at least two macros;
   based on detecting the predetermined critical path in the circuit design, further detecting:
      at least one output or at least one input for each of one or more macros of the at least two macros associated with the predetermined critical path, the at least one input or the at least one output comprising a location for each of the one or more macros and macro pin information; and
      a routing description and a buffer location corresponding to the predetermined critical path;
   building a reduced layout design, the reduced layout design comprising the predetermined critical path and the at least two macros of the circuit design, wherein the reduced layout design is a subset of the circuit design which excludes macros, interconnects, and buffers of the circuit design not associated with the predetermined critical path;
   generating a timing report based on the reduced layout design; and initiating manufacturing of a circuit based on the circuit design, based on detecting the timing report based on the reduced layout design satisfies a predetermined condition.

18. The computer-implemented method of claim 17, wherein the building the reduced layout design comprises using a script based on a text file comprising the buffer location, the macro pin information, connectivity data indicating how pins are interconnected for the at least two macros, a plurality of layout layers, and buffers used for connection between the at least two macros.

19. The computer-implemented method of claim 17, further comprising:
   detecting a modification of one of the interconnects between the at least two macros in the reduced layout design, wherein the modification comprises a modification selected from the group consisting of: adding repeaters, removing repeaters, changing layout routing layers, changing a location of the at least two macros, and changing macro pin location; and
   generating the timing report based on the modification to the reduced layout design.

20. The computer-implemented method of claim 17, wherein the generating the timing report comprises generating the timing report based on actual routing information for the reduced.

* * * * *